United States Patent
Banks et al.

(10) Patent No.: US 11,863,659 B2
(45) Date of Patent: Jan. 2, 2024

(54) SHIPPING PLATFORM

(71) Applicant: Accenture Global Solutions Limited, Dublin (IE)

(72) Inventors: Sarah Banks, Plymouth, MI (US); Deven Bharat Chhaya, Singapore (SG); Adriana Gabriela Diener-Veinott, Stanford, CA (US)

(73) Assignee: Accenture Global Solutions Limited, Dublin (IE)

( * ) Notice: Subject to any disclaimer, the term of this patent is extended or adjusted under 35 U.S.C. 154(b) by 597 days.

(21) Appl. No.: 16/361,658

(22) Filed: Mar. 22, 2019

(65) Prior Publication Data

US 2019/0296895 A1    Sep. 26, 2019

(30) Foreign Application Priority Data

Mar. 23, 2018 (SG) .......................... 10201802432R
Mar. 21, 2019 (SG) .......................... 10201902517Q

(51) Int. Cl.

| | |
|---|---|
| *H04L 9/06* | (2006.01) |
| *G06Q 20/36* | (2012.01) |
| *G06Q 10/083* | (2023.01) |
| *G06F 21/62* | (2013.01) |
| *G06F 16/953* | (2019.01) |
| *H04L 9/00* | (2022.01) |

(52) U.S. Cl.
CPC .......... *H04L 9/0637* (2013.01); *G06F 16/953* (2019.01); *G06F 21/6218* (2013.01); *G06Q 10/0838* (2013.01); *G06Q 20/363* (2013.01); *G06Q 2220/00* (2013.01); *H04L 9/50* (2022.05)

(58) Field of Classification Search
CPC ..... H04L 9/0637; H04L 2209/38; H04L 9/50; G06F 16/953; G06F 21/6218; G06Q 10/0838; G06Q 20/363; G06Q 2220/00
USPC .......................................................... 705/51
See application file for complete search history.

(56) References Cited

U.S. PATENT DOCUMENTS

| | | |
|---|---|---|
| 2015/0262176 A1 * | 9/2015 | Langschaedel et al. |
| 2016/0164884 A1 * | 6/2016 | Sriram et al. |
| 2017/0083860 A1 * | 3/2017 | Sriram et al. |
| 2018/0075028 A1 * | 3/2018 | Ruschin et al. |
| 2018/0211202 A1 * | 7/2018 | Ynion |
| 2018/0232693 A1 * | 8/2018 | Gillen et al. |
| 2018/0341910 A1 * | 11/2018 | Broveleit |

(Continued)

*Primary Examiner* — Neha Patel
*Assistant Examiner* — Yin Y Choi
(74) *Attorney, Agent, or Firm* — Fish & Richardson P.C.

(57) ABSTRACT

Methods, systems, and apparatus, including computer programs encoded on a computer storage medium, for a shipping platform are disclosed. In one aspect, a method includes the actions of receiving data identifying goods for shipping, data identifying a shipper of the goods, and a cryptographic key. The actions further include processing the data identifying the goods and the data identifying the shipper using the cryptographic key. The actions further include storing, in a blockchain, the processed data identifying the goods and the processed data identifying the shipper. The actions further include receiving a query requesting data associated with the goods. The actions further include accessing the data associated with the goods from the blockchain. The actions further include providing, for output, the data associated with the goods.

18 Claims, 4 Drawing Sheets

(56) References Cited

U.S. PATENT DOCUMENTS

2019/0130394 A1* 5/2019 Stollman
2019/0385229 A1* 12/2019 Leonard et al.
2020/0349534 A1* 11/2020 Haldenby et al.

* cited by examiner

SHIPPING PLATFORM

CROSS REFERENCE TO RELATED APPLICATION

This application claims the benefit of Singapore Application No. 10201902517Q, filed Mar. 21, 2019 which claims the benefit of Singapore Application No. 10201802432R, filed Mar. 23, 2018, the contents of both are incorporated by reference.

TECHNICAL FIELD

This specification generally relates to data security and integrity.

BACKGROUND

Data integrity relates to the maintenance of, and the assurance of the accuracy and consistency of, data over its entire life-cycle, and is a critical aspect to the design, implementation and usage of any system which stores, processes, or retrieves data. Data security relates to protecting digital data, such as those in a database, from destructive forces and from the unwanted actions of unauthorized users, such as a cyberattack or a data breach.

SUMMARY

This specification describes a shipping platform that is a data-based shipping process managed using blockchain technology and that can be used by various parties to support shipping, title transference, insurance, finance, and customs clearance. This blockchain platform can be shared and authenticated to facilitate the transactions involved in shipping from origin to destination. The blockchain platform is data-based instead of document based. In other words, blockchain technology may be used to manage and distribute data to appropriate parties within a shipping transaction and eliminate the need for documentation flow.

The shipping platform may be used to eliminate the need for printed shipping documents for shipping goods internationally, which may not only save the freight and logistics industry, it may also reduce the computing power required to ship goods.

In the shipping platform, documents may no longer be exchanged physically or digitally but instead, the relevant data is shared and distributed using blockchain technology under single ownership principles determined by the type of information. The trust and security blockchain technology may enable reallocation information ownership, accountability, and risk.

As an example, an international shipment of goods for companies in areas such as the automotive, retail, or consumer goods industries typically requires more than twenty different documents, many of which are often paper-based, to enable the goods to move from exporter to importer. Across these documents, up to seventy percent of the data can be replicated. The document heavy approach may limit data quality and real-time visibility to all parties involved in the trade and can also delay the financial settlement on goods.

The shipping platform can speed up the entire flow of transport documents, reduce the requirement for data entry by up to eighty percent, simplify data amendments across the shipping process, streamline the checks required for cargo, and reduce the burden and risk of penalties for customs compliance levied on customers.

The shipping platform may be implemented in a distributed database system that maintains and records data in a way that allows multiple stakeholders to confidently and securely share access to the same information. In addition to shipping, the platform may be used in financial services, government, healthcare, entertainment, and freight and logistics.

The shipping platform may be used to replace documents by secure and distributed data sharing with clear and defined ownership. This technology helps save time and money while improving the shipping service and can reduce operating costs and increase supply chain visibility.

The shipping platform may improve the efficiency, security, and speed of the container shipping industry. The platform may digitize a paper-based process and overcome the multitude of different interfaces currently used. Additionally, the platform may help to reduce mistakes, digitize information, and improves the supply chain process.

According to an innovative aspect of the subject matter described in this application, a method for implementing a shipping platform includes the actions of receiving, by a blockchain decentralized application, data identifying goods for shipping, data identifying a shipper of the goods, and a cryptographic key; processing, by the blockchain decentralized application, the data identifying the goods and the data identifying the shipper using the cryptographic key; storing, by the blockchain decentralized application and in a blockchain, the processed data identifying the goods and the processed data identifying the shipper; receiving, by the blockchain decentralized application, a query requesting data associated with the goods; accessing, by the blockchain decentralized application, the data associated with the goods from the blockchain; and providing, for output, the data associated with the goods.

These and other implementations can each optionally include one or more of the following features. The actions further include receiving the query requesting the data associated with the goods by receiving, from a user, the query requesting the data associated with the goods and data identifying the user; and, based on receiving the query requesting data associated with the goods and based on the data identifying the user, determining, by the blockchain decentralized application, that the user is authorized to access the data associated with the goods. The action of storing the processed data identifying the goods and the processed data identifying the shipper includes storing a portion of the processed data identifying the goods in a first portion of the block chain that remains online; and storing a remaining portion of the processed data identifying the goods in a second portion of the block chain that remains offline. The actions further include receiving, by the blockchain decentralized application, the data identifying the goods, data identifying a consignee, and an additional cryptographic key; processing, by the blockchain decentralized application, the data identifying the goods and the data identifying the consignee using the additional cryptographic key; and storing, by the blockchain decentralized application and in a blockchain, the processed data identifying the goods and the processed data identifying the consignee.

The action of receiving the data identifying the goods, the data identifying the consignee, and the additional cryptographic key includes receiving data indicating that the consignee is receiving the goods from the shipper. The action of processing the data identifying the goods and the data identifying the shipper using the cryptographic key includes identifying a blockchain wallet of the shipper. The action of storing the processed data identifying the goods and the processed data identifying the shipper includes storing the processed data identifying the goods in the blockchain wallet of the shipper. The action of receiving the query requesting data associated with the goods includes receiving a request for data identifying an entity that is in possession of the goods. The action of accessing the data associated with the goods from the blockchain includes identifying a blockchain wallet that indicates that a particular entity is in possession of the goods. The action of providing the data associated with the goods includes providing data indicating that the particular entity is in possession of the goods.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. Various entities involved in shipping goods may access and share data through a secure platform that is self-verifying.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
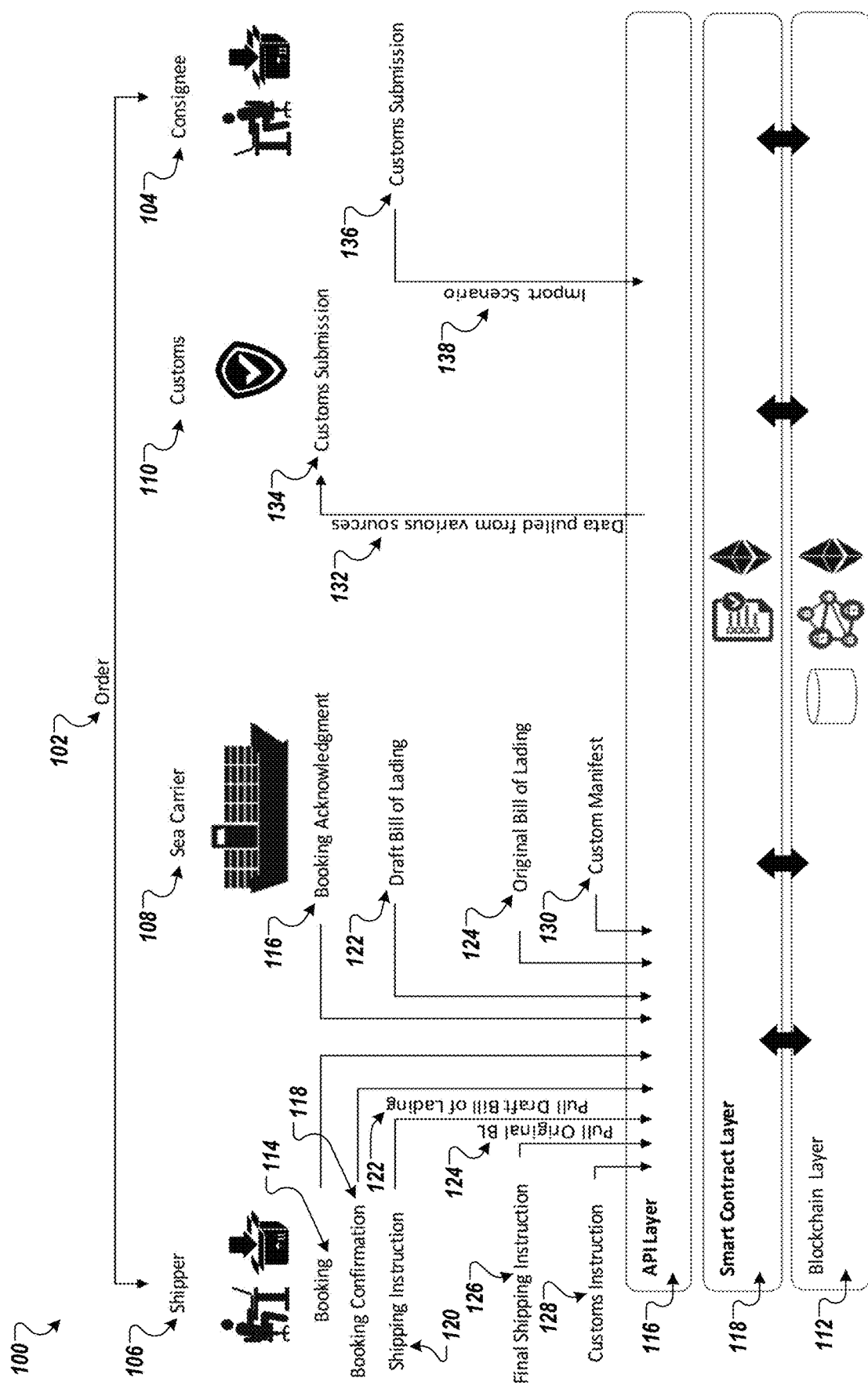
FIG. 1 illustrates an example system for managing a shipping platform using blockchain.

FIG. 1 illustrates an example system 100 for managing a shipping platform using blockchain. Briefly, and as explained in detail below, the system 100 provides a secure platform for each entity involved in an order 102 to monitor the order 102 and ensure the order 102 reaches the intended consignee 104. The system 100 allows the shipper 106, the carrier 108, customs officials 110, and the consignee 104 to access data stored in a blockchain 112 and coordinate and share data to ensure a successful shipment.

In more detail, the shipper 102 receives an order 102 from the consignee 104. The order 102 may be for any types of goods such as personal goods, raw materials, commercial goods, or any other similar type of good. The shipper 102 generates a booking 114 that includes the details of the order 102. For example, the booking 114 may request that one hundred boxes of computers be shipped from China to the United States. The shipper 102 may interact with the system 100 through the API layer 116. The API layer 116 may communicate with any application that the shipper 102 uses including any legacy applications.

The system 100 may include a smart contract layer 118 that automatically enforces any business rules for the shipper 106. The business rules may be requirements that any order sent by the shipper 106 should comply with. The business rules may also ensure that the shipper 106 provides the proper information for a successful shipment. An example business rule may include that if the shipper 106 designates a location in the United States as the designation for the order 102, then the shipper 106 must provide additional information that is specific for the United States, such as specific customs information.

The system 100 accesses the blockchain layer 112 to determine which carrier has cargo space available for the order 102. The blockchain layer 112 may include different cargo wallets for different carriers. The cargo wallets may indicate the space available for each carrier on each route traveled by the carrier. The system 100 may provide several different carrier options for the shipper 106 to select from based on the data accessed from the cargo wallets. Because the blockchain layer 112 decentralizes the data that indicates the space available for each carrier, the system 100 can save computing resources and network resources by not needing to check with each carrier's system to determine the space available.

The system 100 receives a selection of cargo space for the order 102 from the shipper 106. In some implementations, the system 100 generates a selection of cargo space automatically based on the other orders and/or shipping needs of the shipper 106. The system 100 stores the cargo space selection for the order 102 in the blockchain layer 112. The block added to the blockchain layer 112 may indicate that the selected cargo space is booked by the shipper 106. In some implementations, the shipper 106 and/or the carrier 108 may provide a password to the system 100. The system 100 may use the password to generate a cryptographic key or may use the password directly to generate the block to add to the blockchain layer 112.

The system 100 generates a booking acknowledgement 116 to provide to the carrier 108 that indicates the booking stored in the blockchain layer 112 for the selected cargo space. The system 100 also generates the booking confirmation 118 to provide to the shipper 106 that indicates the booking stored in the blockchain layer 112 for the selected cargo space.

With the cargo space selected, the shipper 106 provides a shipping instruction 120 to the system 100. The shipping instruction 120 may include details related to the date of shipment, the identity of the consignee 104, the type of goods, the identity of the carrier 108, the origination location, the destination, and any other similar details. Based on the shipping instruction 120 and the selected cargo space, the system 100 generates a draft bill of lading 122. The draft bill of lading 122 may be provided to both the shipper 106 and the carrier 108. The shipper 106 and the carrier 108 review the draft bill of lading 122 and submit any corrections to the system 100. In some implementations, the system 100 may automatically review the draft bill of lading 122 and automatically correct or suggest changes based on the data stored in the blockchain layer 112 and/or rules stored in the smart contract layer 118.

The system 100 receives corrections to the draft bill of lading 122 and generates the bill of lading 124. The shipper 106 receives the bill of lading 124 and submits a final shipping instruction 126 and customs instruction 128 to the API layer 116. The smart contract layer 118 may ensure that the final shipping instruction 126 and customs instruction 128 comply with any requirements for the shipper 106, carrier 108, customs requirements for the destination, and/or the consignee 104.

The blockchain layer 112 receives the bill of lading 124, the final shipping instruction 126, and/or the customs instruction 128. In some implementations, the shipper 106 indicates that when transmitting the bill of lading 124 and the other data to the blockchain layer 112, that the carrier 108 is taking possession of the goods. In some implementations, the shipper 106 may indicate a date and time that the carrier 108 is to take or has taken possession of the goods. The blockchain layer 112 generates a new block to indicate that the carrier 108 has taken possession of the goods by indicating that the wallet of the carrier 108 includes the goods. The block may include the bill of lading 124, data indicating transfer of the goods from the shipper 106 to the carrier 108, customs instructions 128, the shipping instructions 126, and any other relevant details. The blockchain layer 112 may user a password provided by the shipper 106 and/or the carrier 108 to generate the block. The password may be a cryptographic key or the blockchain layer 112 may generate the cryptographic key using the password.

The carrier 108 takes possession of the goods and transports them to the destination port. At the destination port, the carrier 108 provides a customs manifest 130 to the system 100. The blockchain layer 112 may generate an additional block that includes this customs manifest 130. In some implementations, the system 100 may generate the customs manifest 130 automatically based on the bill of lading 124, data indicating transfer of the goods from the shipper 106 to the carrier 108, customs instructions 128, and/or the shipping instructions 126. In some implementations, the customs manifest 130 may be included in its own block or the block with the bill of lading 124.

At the destination port, the customs official 110 accesses the system 100 and retrieves data 132. The system generates a customs submission 134 based on the customs manifest 130, the bill of lading 124, data indicating transfer of the goods from the shipper 106 to the carrier 108, customs instructions 128, and/or the shipping instructions 126. The customs official 110 is able to verify the authenticity of the information on the customs submission 134 because the information is stored in the blockchain layer 112.

After the customs official 110 approves the shipment, the consignee 104 receives the goods. In an import scenario 138, the consignee 104 accesses the system 100 an retrieves the customs submission 136. The consignee 104 may also access the bill of lading 124, data indicating transfer of the goods from the shipper 106 to the carrier 108, customs instructions 128, and/or the shipping instructions 126. The consignee 104 may provide an indication to the system 100 that the consignee 104 has taken possession of the goods. The blockchain layer 112 may add an additional block to indicate the transfer of the goods from the carrier 108 to the consignee 104 by indicating that the wallet of the consignee 104 includes the goods. The consignee 104 may provide a password and/or a cryptographic key that the blockchain layer 112 may use to generate the block. As with previous interactions with the system, the consignee 104 can have confidence that the data stored in the blockchain layer 112 is accurate.

Figure 2:
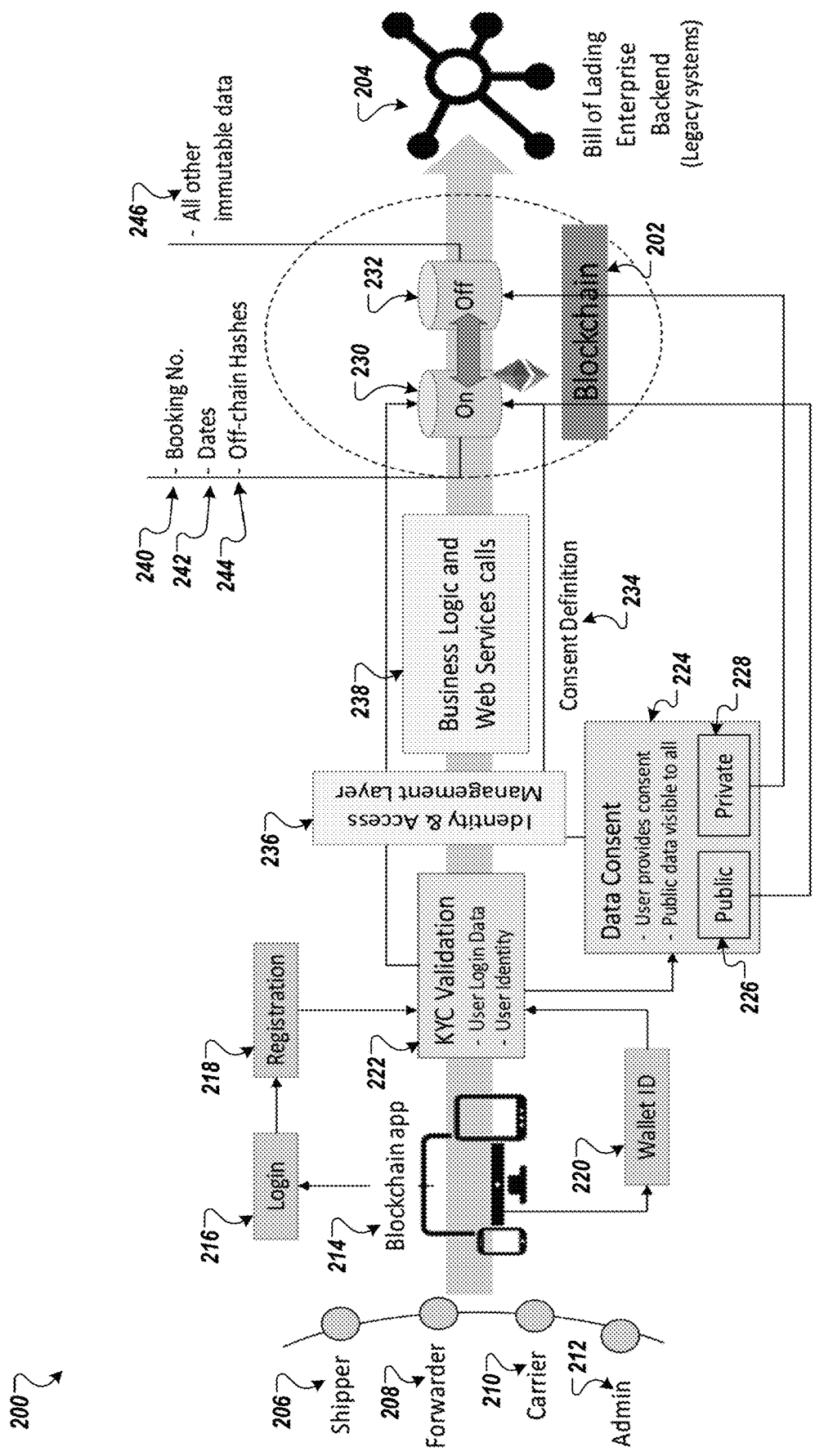
FIG. 2 illustrates example components of a blockchain application.

FIG. 2 illustrates example components of a blockchain application 200. Briefly, and as described in more detail below, the blockchain application 200 provides an access point for the different parties in a shipping transaction to share, store, and access, data related to various shipments by storing the data in a blockchain 202. The blockchain application is configured to interact with legacy applications 204 that the parties may use.

In more detail, the various parties that may include a shipper 206, a forwarder 208, a carrier 210, or an administrator 212. Each party may have access to the blockchain application 200. Each party may use the blockchain application 200 for a different reason, but each party may be confident that the data retrieved from the blockchain application 200 is accurate.

To access the blockchain application 200, each party may access a front end application 214 on a client device. The client device may be any type of computing device such as a phone, tablet, desktop computer, laptop computer, or any other similar computing device. The front end application 214 may require that a user authenticate the user to the front end application 214. In some implementations, a user may access a login screen 216 and/or a registration screen 218 to gain access to the blockchain application 200. In some implementations, the user may provide a wallet identifier 220 to gain access to the blockchain application 220. The validation module 222 may identify the user based on the login information, the registration information, and/or the wallet identifier. The validation module 222 may identify a wallet of the user in instances where the user enters login information or registration information.

The blockchain application 200 may include a data consent module 224. The data consent module 224 may be configured to allow each user to specify an access level for data stored in the blockchain 202. The data consent module 224 may provide a consent definition 234 to the blockchain 202. The consent definition 234 may indicate whether the user selected the public option 226 or the private option 228. In some implementations, a user may enter data and select the public option 226. In this instance, the blockchain application 200 will store the data in the online blockchain 230. In some implementations, a user may enter data and select the private option 228. In this instance, the blockchain application 200 will store the data in the offline blockchain 232. The offline blockchain 232 may be online during some read and write operations. In some implementations, the block chain application 200 may store the data in the online or offline blockchain according to a predetermine rule that will be discussed below.

The blockchain application 200 may include an identity and access management layer 236. The identity and access management layer 246 may be configured to grant different levels of access to the blockchain 202 depending on the permissions of the user. For example, the shipper 206 may have access to information the pertains to the shipper 206 while not having access to data that pertains to the administrator 212 unless that data also pertains to the shipper 206.

The blockchain application 200 may include a business logic and web services calls module 238. The business logic and web services calls module 238 may be configured to access business logic data. The business logic data may include smart contracts that enforce different business rules. For example, the carrier 210 may have a business rule that a shipper 206 much pay for at least a full shipping container. The business logic and web services calls module 238 may be configured to access various web services. For example, the business logic and web services calls module 238 may access data accessible through the internet.

As noted above, the blockchain 202 includes an online blockchain 230 and an offline blockchain 232. The blockchain application 200 may bring the offline blockchain 232 online during specific situations, but generally, the offline blockchain 232 remains offline. The online blockchain 230 may store booking numbers 240, dates 242, and off-chain hashes 244. The booking numbers 240 may be assigned to each shipping request to help distinguish booking numbers. The off-chain hashes may include hash values that are not included in the block as links to other blocks. The offline blockchain 232 may store other immutable data 246. The immutable data 246 may include data that does not change such as cargo capacity of different ships.

The blockchain application 200 may be configured to interface with various legacy applications such as a bill of lading enterprise backend system 204. The blockchain application 200 may receive data in various formats from the different legacy applications. The blockchain application 200 may store data in the blockchain 202 in a standard format. The blockchain application 200 may retrieve data from the blockchain 202 and reformat the data as required by the legacy application before providing the data to the legacy application.

Figure 3:
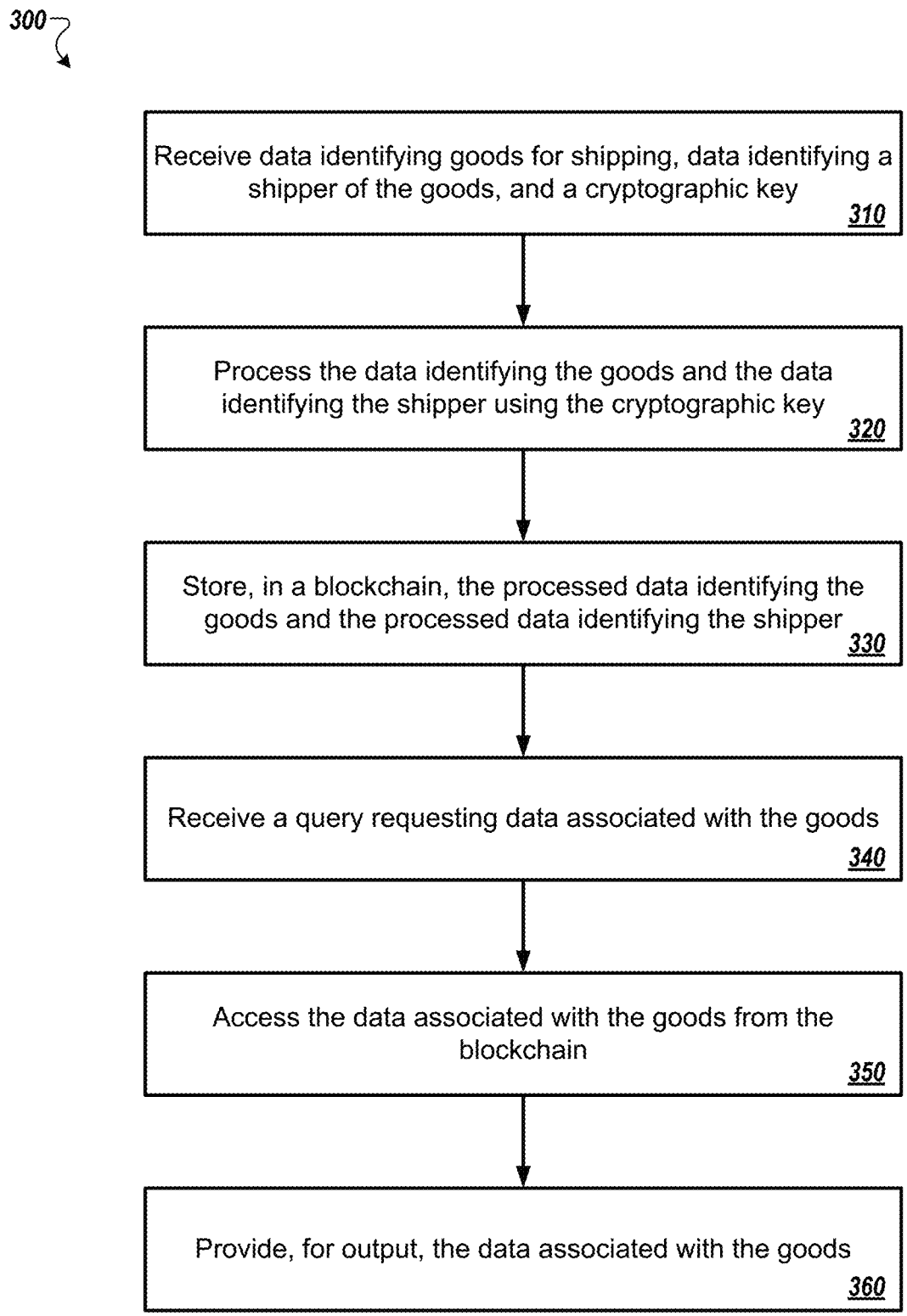
FIG. 3 is a flowchart of an example process for managing a shipping platform using blockchain.

FIG. 3 is a flowchart of an example process 300 for managing a shipping platform using blockchain. In general, the process 300 describes receiving a shipping request and storing data associated with that shipping request in a blockchain. The process 300 also describes accessing the data stored in the blockchain. The process 300 may receive a request for shipping data and provide the requested shipping data to the user. The process 300 will be described as being performed by a computer system comprising one or more computers, for example, the system 100 of FIG. 1 or a computing system executing the blockchain application 200 of FIG. 2.

The system receives data identifying goods for shipping, data identifying a shipper of the goods, and a cryptographic key (310). For example, the system may receive, from a shipper, a request to ship one thousand boxes of phones from China to the United States. The request may identify the shipper, and the shipper may provide a password and/or a cryptographic key. In the case of a password, the system may generate a cryptographic key using the password.

The system processes the data identifying the goods and the data identifying the shipper using the cryptographic key (320). For example, the system may generate a block to add to the blockchain by hashing the data identifying the goods and the data identifying the shipper along with previous blocks using the cryptographic key. In some implementations, the system may indicate that the wallet of the shipper has possession of the goods. This may change as other parties take possession of the goods such as when the carrier takes possession of the goods.

The system stores, in a blockchain, the processed data identifying the goods and the processed data identifying the shipper (330). The system adds the block to the blockchain. In some implementations, the block includes data indicating that the wallet of the shipper has possession of the goods. In some implementations, a portion of the blockchain may be stored online and a remaining portion of the blockchain may be stored offline. The type of data stored in the blockchain may determine in which blockchain the system stores the data.

In some implementations, the system receives data identifying the goods, data identifying a consignee, and an additional cryptographic key. For example, the consignee may be taking possession of the goods. The consignee provides an identifier and a password and/or cryptographic key for the system to generate a new block that indicates that the goods have transferred to the consignee. This action may occur by the system processing the data identifying the goods and the data identifying the consignee using the additional cryptographic key and storing the processed data identifying the goods and the processed data identifying the consignee. In some implementations, the system may indicate that the wallet of the consignee includes the goods.

The system receives a query requesting data associated with the goods (340). For example, the system may receive a query from a customs agent or from a shipper that would like to determine whether the carrier or the consignee has possession of the goods. In some implementations, the system may determine whether the user requesting the data has permission to access the requested data.

The system accesses the data associated with the goods from the blockchain (350). For example, the system may access the blockchain to determine the entity in possession of the goods. The blockchain may indicate that the wallet of the consignee has possession of the goods. The system provides, for output, the data associated with the goods (360). For example, the system may indicate that the consignee is in possession of the goods.

A blockchain is a public or private ledger of all transactions that have been executed in one or more contexts (e.g., negotiable instrument transactions, digital currency transactions, access determinations, instances of providing access, etc.). A blockchain may grow as completed blocks are added with a new set of transactions. In some examples, a single block is provided from multiple transactions (e.g., multiple deposits of different checks by different people). In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device (or a cluster of multiple devices) that uses a client to validate and relay transactions. Each node maintains a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because entities on the blockchain network may need to know all previous transactions to validate a requested transaction, all entities may have to agree on which transactions have actually occurred, and in which order. For example, if two entities observe different transaction histories, they will be unable to come to the same conclusion regarding the validity of a transaction. The blockchain enables all entities to come to an agreement as to transactions that have already occurred, and in which order. In short, and as described in further detail below, a ledger of transactions is agreed to based on the amount of work required to add a transaction to the ledger of transactions (e.g., add a block to the blockchain). Blockchains can employ any appropriate proof-of-work mechanism. Blockchains may also employ other protocols. In this context, the work is a task that is difficult for any single node (e.g., computing device) in the peer-to-peer network to quickly complete, but is relatively easy for a node (e.g., computing device) to verify.

The peer-to-peer network includes so-called miners (e.g., computing devices) that add blocks to a blockchain based on the blockchain protocol. In general, multiple miners validate transactions that are to be added to a block, and compete (e.g., perform work, as introduced above) to have their block added to the blockchain. Validation of transactions includes verifying digital signatures associated with respective transactions. For a block to be added to the blockchain, a miner must demonstrate a proof of work before their proposed block of transactions is accepted by the peer-to-peer network, and is added to the blockchain. A blockchain protocol includes a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value, in that the hash value cannot be 'un-hashed' to determine what the input was. The blockchain protocol can require multiple pieces of information as input to the CHF. For example, the input to the CHF can include a reference to the previous (most recent) block in the blockchain, details of the transaction(s) that are to be included in the to be created block, and a nonce value (e.g., a random number used only once).

Multiple nodes may compete to hash a set of transactions and provide the next block that is to be added to the blockchain. The blockchain protocol provides a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain. Each miner provides the reference to the previous (most recent) block in the blockchain, details of the transaction(s) that are to be included in the to-be-created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain. Consequently, the respective miner's block is broadcast across the peer-to-peer network. All other miners cease work (because one miner was already successful), and all copies of the blockchain are updated across the peer-to-peer network to append the block to the blockchain. Each miner may be required to produce hundreds or thousands of hash values, before any one miner provides a qualifying hash value (e.g., at least the first four characters of the hash value are each zero).

In some cases, shipping platform can include one or more sidechains. A sidechain can be described as a blockchain that validates data from other blockchains. In some examples, a sidechain enables ledger assets (e.g., a digital currency, records of shares or other items, etc.) to be transferred between multiple blockchains using a suitable interoperability protocol.

The blockchain may be a public blockchain, such that data stored on the blockchain is generally accessible. The blockchain may be a private blockchain, such that the stored data is accessible only to authorized individuals and/or processes on the blockchain. A private blockchain may be accessible by entities and/or processes that have been authorized to access the blockchain, and any suitable access control mechanism may be employed to control access to the private blockchain. A private blockchain may not require proof of work, and may use other suitable mechanisms for allowing information to be added to the blockchain.

Figure 4:
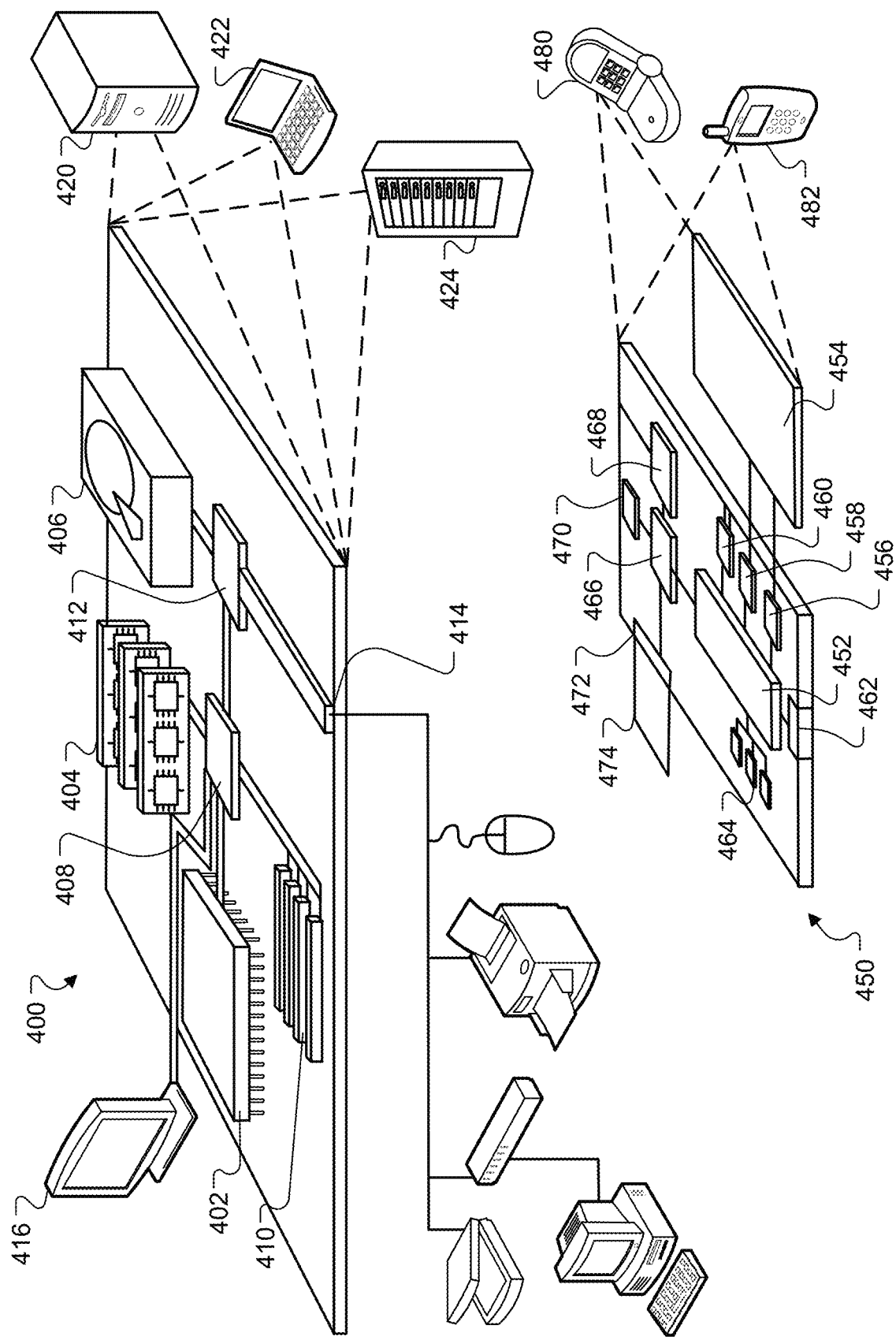
FIG. 4 is an example of a computing device and a mobile computing device.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, wireless (e.g., Bluetooth) headsets, hearing aid, smart watches, smart glasses, activity trackers, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, a microphone, speakers, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a touch-enabled display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
receiving, from a shipper of goods and by a blockchain decentralized application that manages a wallet for the shipper and wallets for multiple carriers that indicate space that is available for each respective carrier, data, in a legacy data format, that identifies the goods that are to be shipped, and a cryptographic key;
selecting, by the blockchain decentralized application and from among the wallets for multiple carriers that are managed by the blockchain centralized application, a particular wallet for a particular carrier that indicates that space is available to ship the goods;
reformatting, by the blockchain decentralized application, the data that identifies the goods that are to be shipped from the legacy data format into a standard data format;
generating, by the blockchain decentralized application, a first additional block to add to a blockchain based on the reformatted data and the cryptographic key, the first additional block including data that indicates that the wallet of the shipper has possession of the goods and data that indicates that the shipper has booked space to ship the goods in the selected, particular wallet of the particular carrier;
storing, by the blockchain decentralized application, the first additional block in the blockchain;
receiving, by the blockchain decentralized application, an indication from the shipper that the particular carrier has taken possession of the goods;
in response to receiving the indication from the shipper that the particular carrier has taken possession of the goods, generating, by the blockchain decentralized application, a second additional block to add to the blockchain based on the reformatted data and the cryptographic key, the second additional block including data that indicates that the wallet of the shipper is not in possession of the goods, and data that indicates that the selected, particular wallet of the particular carrier has possession of the goods;
storing, by the blockchain decentralized application, the second additional block in the blockchain, and
at any time before or after the goods are shipped, using, by the blockchain decentralized application, the blockchain to respond to third party shipping status queries about the goods.

2. The method of claim 1, wherein the particular wallet for the particular carrier is selected without separately querying a resource controlled by the particular carrier to determine if space is available.

3. The method of claim 1, wherein the particular wallet for the particular carrier is selected by the blockchain decentralized application without further involvement of the shipper.

4. The method of claim 1, comprising generating, by a system that includes the blockchain decentralized application, a draft bill of lading for the shipper based on data stored in the blockchain.

5. The method of claim 1, comprising generating, by a system that includes the blockchain decentralized application, a draft bill of lading for the shipper based on rules stored in a smart contract layer.

6. The method of claim 1, wherein the second additional block includes a bill of lading for the goods.

7. The method of claim 1, wherein using the blockchain to respond to third party shipping status queries comprises:
receiving a query from a customs agent; and
providing data from the first additional block and the second additional block to the customs agent in response to the query.

8. The method of claim 1, wherein the blockchain is an offline blockchain, and wherein storing the first additional block or the second additional block comprises bringing the offline blockchain online.

9. A system comprising:
one or more computers; and
one or more storage devices storing instructions that are operable, when executed by the one or more computers, to cause the one or more computers to perform operations comprising:
receiving, from a shipper of goods and by a blockchain decentralized application that manages a wallet for the shipper and wallets for multiple carriers that indicate space that is available for each respective carrier, data, in a legacy data format, that identifies the goods that are to be shipped, and a cryptographic key;
selecting, by the blockchain decentralized application and from among the wallets for multiple carriers that are managed by the blockchain centralized application, a particular wallet for a particular carrier that indicates that space is available to ship the goods;
reformatting, by the blockchain decentralized application, the data that identifies the goods that are to be shipped from the legacy data format into a standard data format;
generating, by the blockchain decentralized application, a first additional block to add to a blockchain based on the reformatted data and the cryptographic key, the first additional block including data that indicates that the wallet of the shipper has possession of the goods and data that indicates that the shipper has booked space to ship the goods in the selected, particular wallet of the particular carrier;
storing, by the blockchain decentralized application, the first additional block in the blockchain;
receiving, by the blockchain decentralized application, an indication from the shipper that the particular carrier has taken possession of the goods;
in response to receiving the indication from the shipper that the particular carrier has taken possession of the goods, generating, by the blockchain decentralized application, a second additional block to add to the blockchain based on the reformatted data and the cryptographic key, the second additional block including data that indicates that the wallet of the shipper is not in possession of the goods, and data that indicates that the selected, particular wallet of the particular carrier has possession of the goods;
storing, by the blockchain decentralized application, the second additional block in the blockchain, and
at any time before or after the goods are shipped, using, by the blockchain decentralized application, the blockchain to respond to third party shipping status queries about the goods.

10. The system of claim 9, wherein the particular wallet for the particular carrier is selected without separately querying a resource controlled by the particular carrier to determine if space is available.

11. The system of claim 9, wherein the particular wallet for the particular carrier is selected by the blockchain decentralized application without further involvement of the shipper.

12. The system of claim 9, wherein the operations comprise generating, by the system that includes the blockchain decentralized application, a draft bill of lading for the shipper based on data stored in the blockchain.

13. The system of claim 9, wherein the operations comprise generating, by the system that includes the blockchain decentralized application, a draft bill of lading for the shipper based on rules stored in a smart contract layer.

14. The system of claim 9, wherein the second additional block includes a bill of lading for the goods.

15. The system of claim 9, wherein using the blockchain to respond to third party shipping status queries comprises:
receiving a query from a customs agent; and
providing data from the first additional block and the second additional block to the customs agent in response to the query.

16. The system of claim 9, wherein the blockchain is an offline blockchain, and wherein storing the first additional block or the second additional block comprises bringing the offline blockchain online.

17. A non-transitory computer-readable medium storing software comprising instructions executable by one or more computers which, upon such execution, cause the one or more computers to perform operations comprising:
receiving, from a shipper of goods and by a blockchain decentralized application that manages a wallet for the shipper and wallets for multiple carriers that indicate space that is available for each respective carrier, data, in a legacy data format, that identifies the goods that are to be shipped, and a cryptographic key;
selecting, by the blockchain decentralized application and from among the wallets for multiple carriers that are managed by the blockchain centralized application, a particular wallet for a particular carrier that indicates that space is available to ship the goods;
reformatting, by the blockchain decentralized application, the data that identifies the goods that are to be shipped from the legacy data format into a standard data format;
generating, by the blockchain decentralized application, a first additional block to add to a blockchain based on the reformatted data and the cryptographic key, the first additional block including data that indicates that the wallet of the shipper has possession of the goods and data that indicates that the shipper has booked space to ship the goods in the selected, particular wallet of the particular carrier;
storing, by the blockchain decentralized application, the first additional block in the blockchain;
receiving, by the blockchain decentralized application, an indication from the shipper that the particular carrier has taken possession of the goods;
in response to receiving the indication from the shipper that the particular carrier has taken possession of the goods, generating, by the blockchain decentralized application, a second additional block to add to the blockchain based on the reformatted data and the cryptographic key, the second additional block including data that indicates that the wallet of the shipper is not in possession of the goods, and data that indicates that the selected, particular wallet of the particular carrier has possession of the goods;
storing, by the blockchain decentralized application, the second additional block in the blockchain, and
at any time before or after the goods are shipped, using, by the blockchain decentralized application, the blockchain to respond to third party shipping status queries about the goods.

18. The medium of claim 17, wherein the particular wallet for the particular carrier is selected without separately querying a resource controlled by the particular carrier to determine if space is available.

* * * * *